LEGEND:
- a  ACCELERATION RATIO
- v  VELOCITY RATIO
- d  DISPLACEMENT RATIO
- $\xi$  ACCELERATION RESPONSE RATIO
- $\beta$  VELOCITY RESPONSE RATIO
- $\gamma$  DISPLACEMENT RESPONSE RATIO INVENTOR.
ROBERT W. KEARNS
BY John Joseph Roethel
Attorney INVENTOR.
ROBERT W. KEARNS
BY
John Joseph Roethel
Attorney CASE I
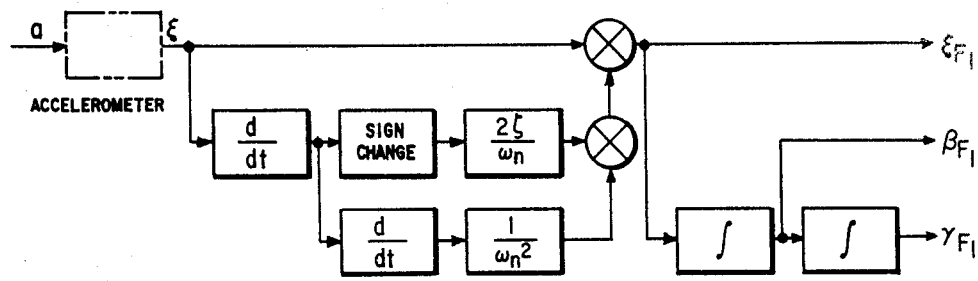
CASE II
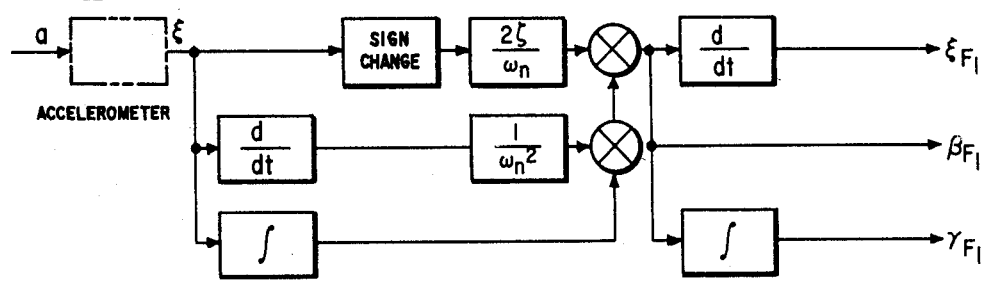
CASE III
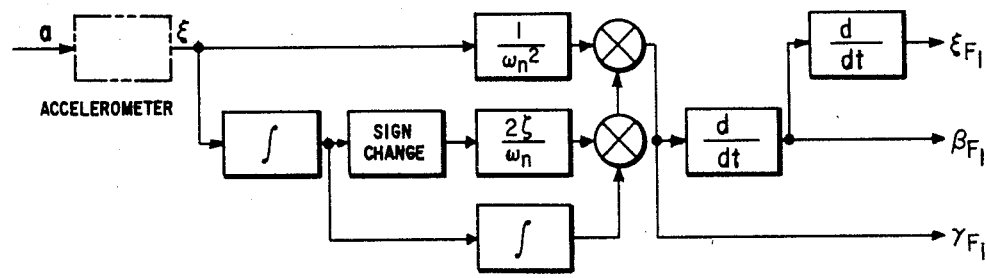
Fig. 8.
LEGEND
DIFFERENTIATOR  INTEGRATOR  SUMMATION
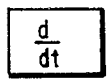  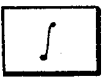  
INVENTOR.
ROBERT W. KEARNS
BY
John Joseph Roethel
Attorney

| CASE | ACCELERATION | VELOCITY | DISPLACEMENT |
|---|---|---|---|
| IDEAL | $\xi(s) \ F_I(s)$ | $\dfrac{\xi(s) \ F_I(s)}{s}$ | $\dfrac{\xi(s) \ F_I(s)}{s^2}$ |
| I | $\dfrac{\xi(s)}{(1+T_1 s)(1+T_2 s)}\{F_I(s) + E_1(s)\}$ <br> where: <br> $E_1(s) = T_2 s^2 \left[ T_1 + \dfrac{2\zeta}{\omega_n} \right] + s(T_1 + T_2)$ | $\dfrac{\xi(s)}{s(1+T_1 s)(1+T_2 s)}\{F_I(s) + E_1(s)\}$ | $\dfrac{\xi(s)}{s^2(1+T_1 s)(1+T_2 s)}\{F_I(s) + E_1(s)\}$ |
| II | $\dfrac{\xi(s)}{(1+T_1 s)(1+T_2 s)}\{F_I(s) + E_2(s)\}$ <br> where: <br> $E_2(s) = s T_1 \left[ 1 + \dfrac{2\zeta s}{\omega_n} \right]$ | $\dfrac{\xi(s)}{s(1+T_1 s)}\{F_I(s) + E_2(s)\}$ | $\dfrac{\xi(s)}{s^2(1+T_1 s)}\{F_I(s) + E_2(s)\}$ |
| III | $\dfrac{\xi(s)}{(1+T_1 s)(1+T_2 s)}\{F_I(s)\}$ | $\dfrac{\xi(s)}{s(1+T_1 s)}\{F_I(s)\}$ | $\dfrac{\xi(s)}{s^2}\{F_I(s)\}$ |

Fig. 11.

Nov. 8, 1960   R. W. KEARNS   2,959,347
MEANS FOR EXTENDING THE USEFUL FREQUENCY
RESPONSE OF MEASURING INSTRUMENTS
Filed Aug. 26, 1957   9 Sheets-Sheet 9

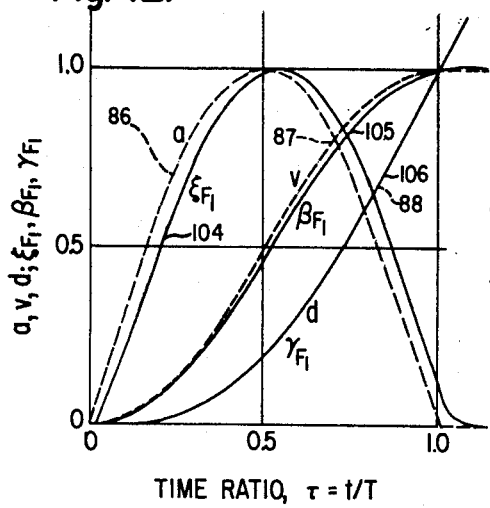

Fig. 12.

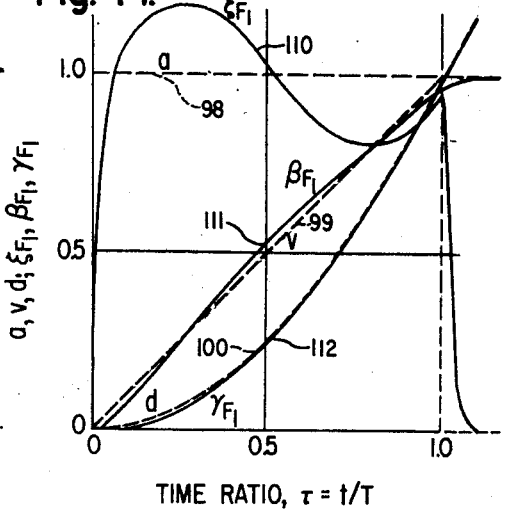

Fig. 14.

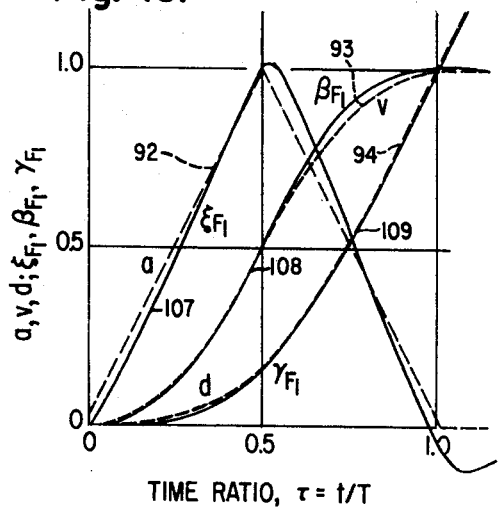

Fig. 13.

LEGEND:

a, ACCELERATION RATIO v, VELOCITY RATIO d, DISPLACEMENT RATIO $\xi_{F_1}$, ACCELERATION RESPONSE RATIO WITH INSTRUMENT FUNCTION $\beta_{F_1}$, VELOCITY RESPONSE RATIO WITH INSTRUMENT FUNCTION $\gamma_{F_1}$, DISPLACEMENT RESPONSE RATIO WITH INSTRUMENT FUNCTION INVENTOR.
ROBERT W. KEARNS
BY
John Joseph Roethel
Attorney

United States Patent Office 2,959,347
Patented Nov. 8, 1960

2,959,347

MEANS FOR EXTENDING THE USEFUL FREQUENCY RESPONSE OF MEASURING INSTRUMENTS

Robert W. Kearns, 20524 Rutherford, Detroit 35, Mich.

Filed Aug. 26, 1957, Ser. No. 680,122

19 Claims. (Cl. 235—61)

This invention relates to a method and means for extending the useful frequency response of measuring instruments without impairing the fidelity of measurement.

More particularly the present invention is explained in terms of its application to accelerometers utilized in inertial navigation systems. There is at present a need for precise and reliable accelerometers of improved sensitivity, resolution and range for use in inertial navigation systems since the accelerometer is basically the heart of such systems. The precision of accelerometers in their current stage of development has been derived by a process of refinement. But even now the requirements exceed the state of the art by several orders of magnitude.

It is an object of the present invention to provide a basically improved design theory applicable not only to accelerometers but to other measuring instruments requiring characteristics of sensitivity, resolution and range not heretofore available. Basically, the present invention proceeds on the assumption that the design of measuring instruments, more particularly accelerometers, has reached a plateau of optimum refinement. Accordingly, it is a particular object of the present invention to provide a theory of design for providing means complementary to the present optimum systems to further extend the sensitivity, range and resolution thereof. Restated, the present invention provides:

(A) A theory of design and an implementation of said theory to provide a device or instrument which when added to another device or instrument results in total dynamic characteristics of unity for the system.

(B) A theory of design and an implementation thereof in which ideally the added device or instrument has dynamic characteristics which are equivalent to the reciprocal of the dynamic characteristics of the original device or instrument used in the system.

(C) A theory of design and an implementation thereof in which the added device or instrument has dynamic characteristics which can take as many forms as there are outputs in the original system in which the original instrument is used.

(D) A theory of design and an implementation thereof in which the added ideal device or instrument may contain filters to control the noise amplified by said added device or instrument but at the expense of the ideal characteristics.

(E) A theory of design and an implementation thereof in which filters may be added to the ideal device or instrument to control the noise amplification in some outputs but will not degrade other outputs from the ideal characteristics.

(F) A theory of design and an implementation thereof in which the added device or instrument may be placed ahead of the original device in the system and the latter will filter any noise amplified by the added device or instrument.

The implementation of the theory of design will hereinafter be more generally referred to as the introduction of an instrument function into the system.

In addition to the provision of the above outlined theories of design and implementation thereof, the present invention includes within its scope certain methods relating to the utilization of accelerometers in inertial guidance systems. They may be briefly summarized as follows:

(a) A method of obtaining the exact displacement of a body to which an accelerometer is attached.

(b) A method of obtaining the exact velocity of a body to which an accelerometer is attached.

(c) A method of obtaining the exact acceleration of a body to which an accelerometer is attached.

Some additional applications incidental to the theories of design and implementation thereof derived from the present invention are:

(d) A method of mathematically predicting the increased frequency range obtained by the use of an instrument function.

(e) A method for obtaining certain dynamic characteristics of a device or instrument without regard for the damping ratio.

(f) A method of obtaining linear measurements without regard for the natural frequency or the time ratio.

(g) A method of computing acceleration, velocity and distance from the response of an accelerometer which is not any more sensitive to low frequency noise than the usual method.

(h) A method of making an instrument useful over an extended frequency range, the median frequency being determined by the application.

(i) The method of applying the technique to any device or instrument whose characteristics are known or may be known approximately or experimentally.

In order that the explanation of the principles of the present invention may be better understood, there is presented in the accompanying drawings a series of diagrams, the brief description of which is as follows.

Figure 3:
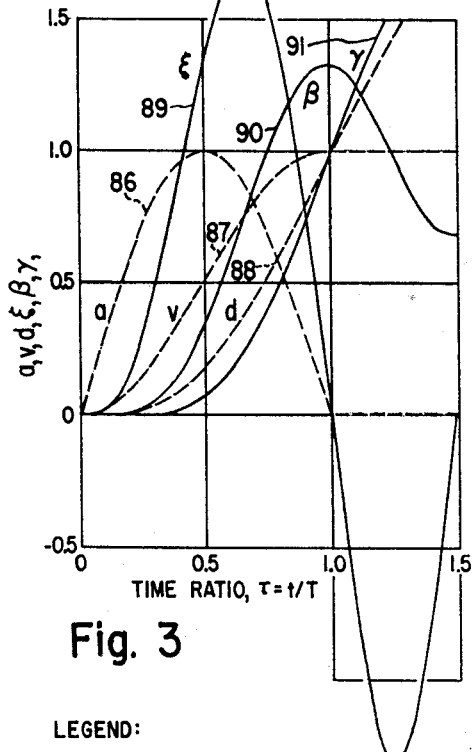
Fig. 3 illustrates curves plotted for an accelerometer having a natural period to pulse duration ratio of R equal to one and a damping ratio ($\zeta$) equal to zero, the curves illustrating reference half sine wave acceleration and associated velocity and displacement ratios.
Figure 4:
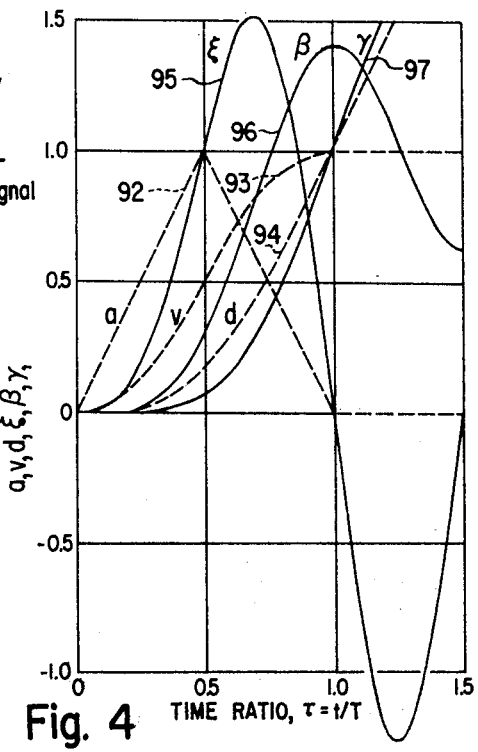
Fig. 4 illustrates curves plotted for the same accelerometer as Fig. 3 but represents ratios based on a triangular form of acceleration.
Figure 5:
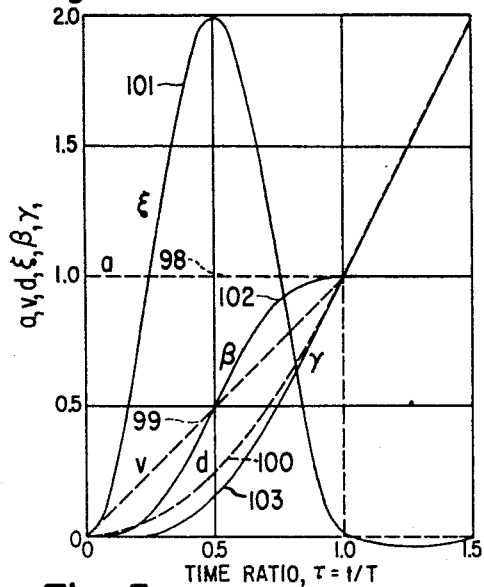

Fig. 5 corresponds to Figs. 3 and 4 but represents ratios based on a square form of acceleration.

Figure 6:
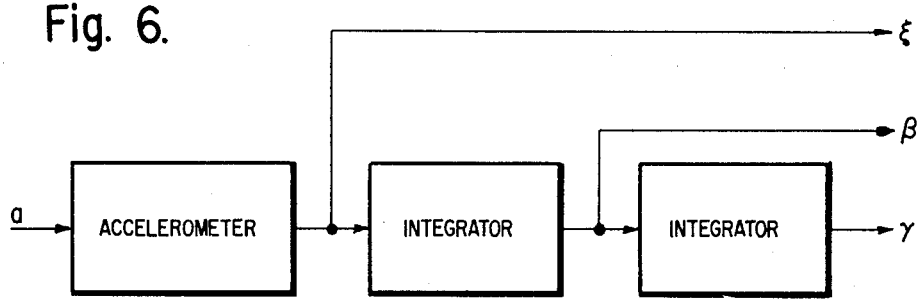

Fig. 6 is a diagrammatic representation of a method of computing the navigation system outputs from a measurement of the acceleration input.

Figure 7:
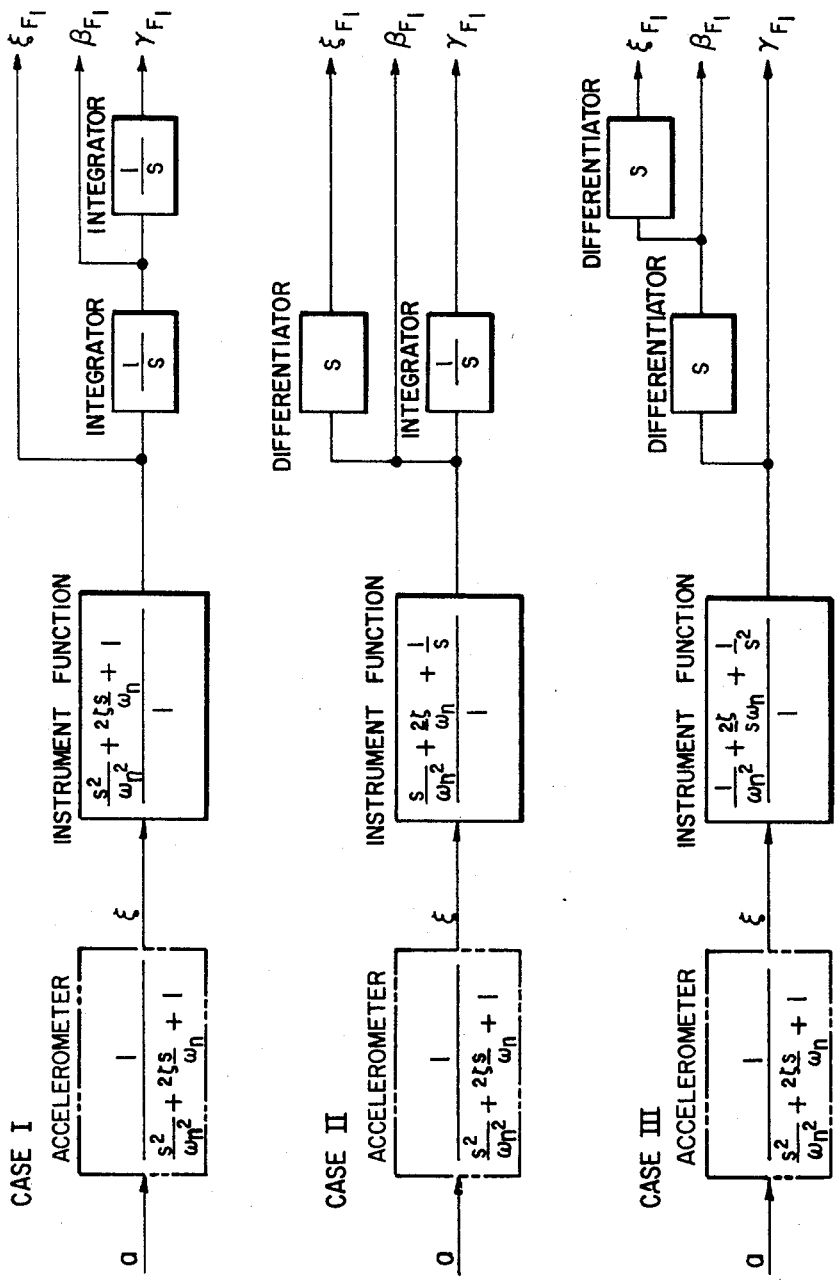

Fig. 7 is a diagrammatic representation of the dynamic characteristics of three navigational accelerometer instrument functions.

Fig. 8 are functional block diagrams of the mathematical operations required to instrument the navigational accelerometer instrument functions.

Figure 9:
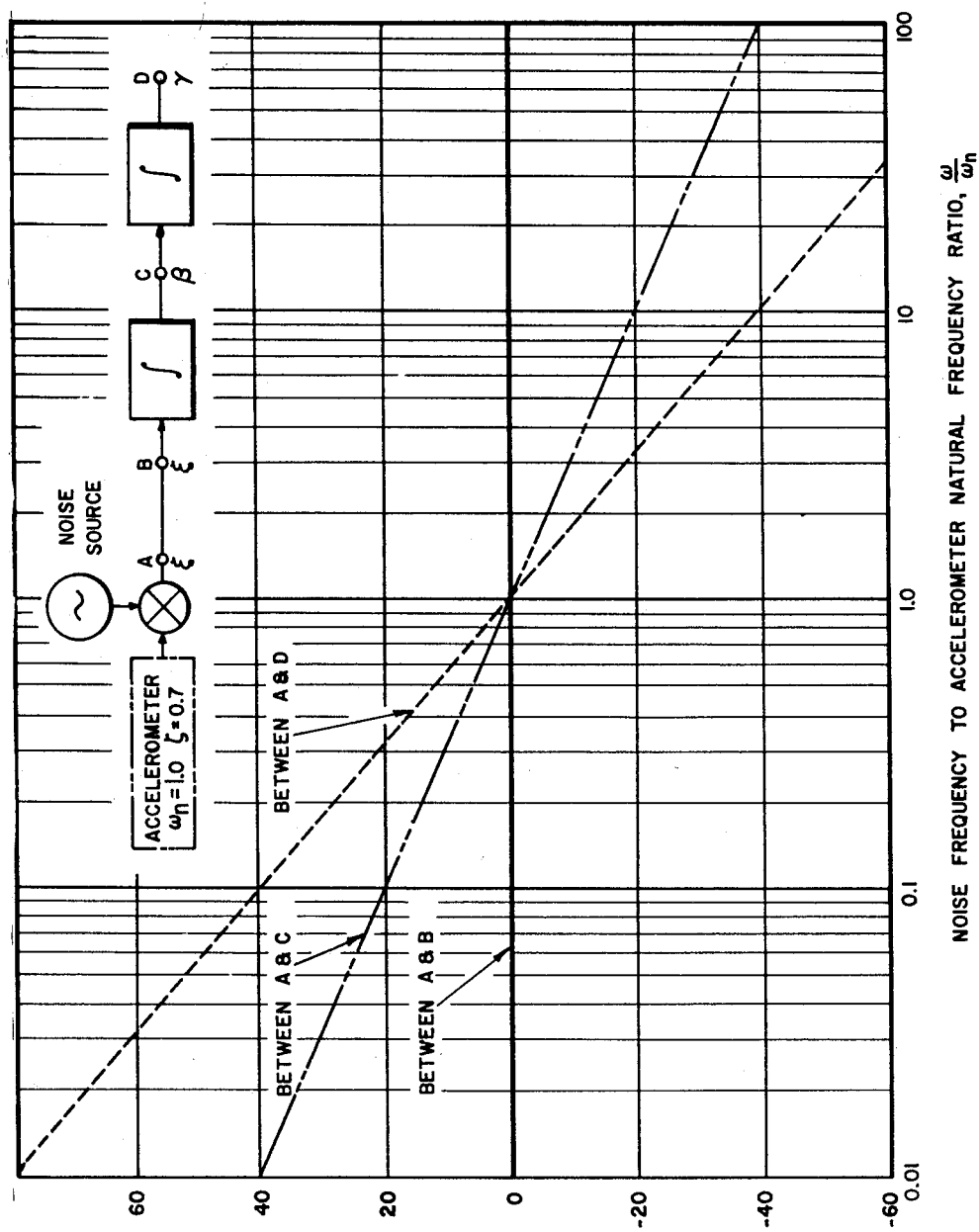

Fig. 9 is a graph illustrating the noise frequency sensitivity of navigational accelerometer external computing circuitry.

Figure 10:
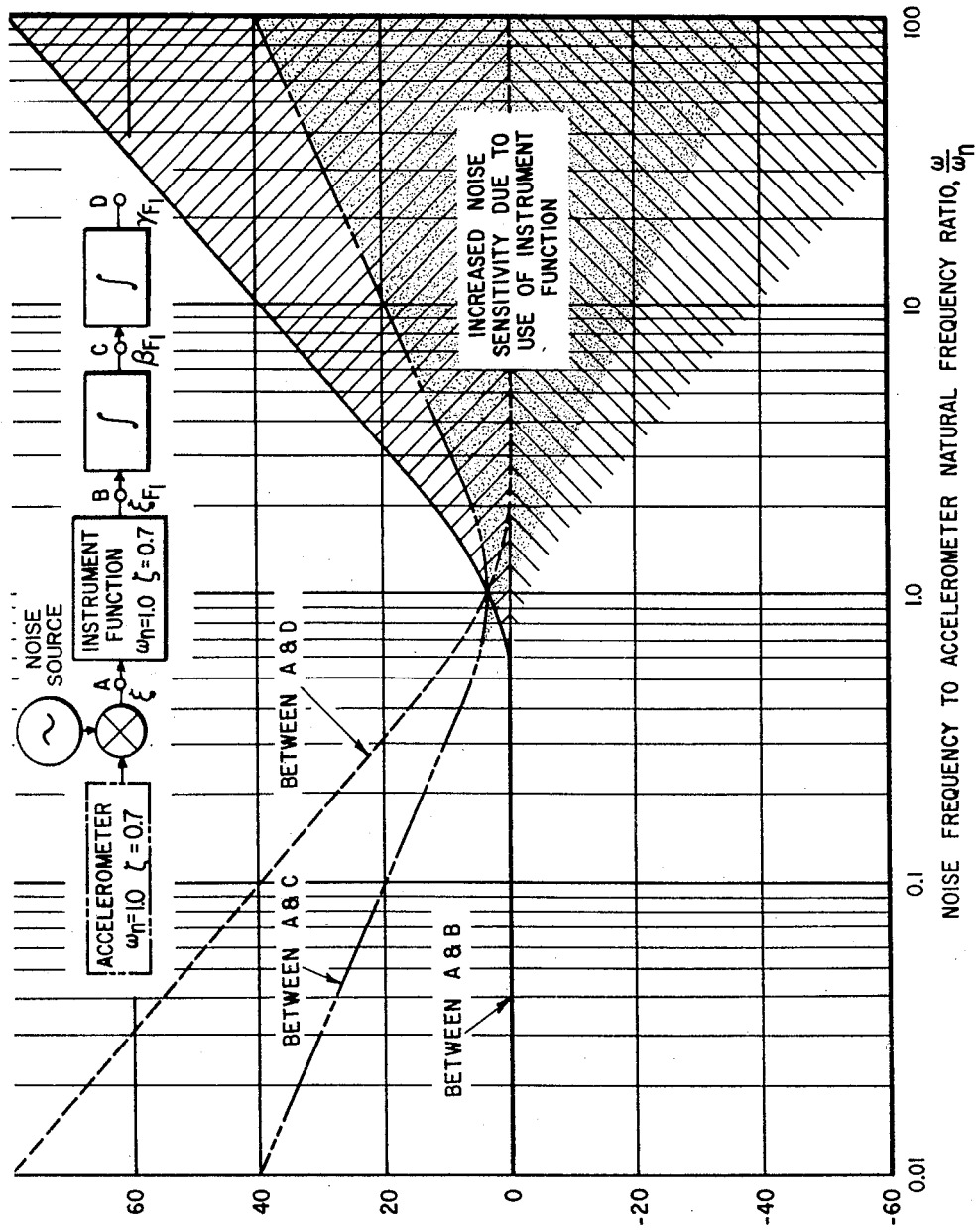

Fig. 10 is a graph illustrating the noise frequency sensitivity of the navigational accelerometer external computing circuitry containing an ideal instrument function.

Fig. 11 is a table summarizing the dynamic characteristics of an accelerometer of function in ideal form with pure differentiators, as well as case I, case II and case III forms with approximate differentiators.

Fig. 12 represents the acceleration, velocity and displacement response ratios computed from an accelerometer ($R=1.00$, $\xi=0$) subjected to a half-sine-wave pulse of acceleration using a practical ($T_1=T_2=0.1$) case III instrument function.

Figs. 13 and 14 are similar to Fig. 12 but computed from accelerometers using a triangular pulse acceleration using a practical ($T_1=T_2=0.1$) case II instrument function and a square pulse acceleration using a practical ($T_1=T_2=0.1$) case I instrument function, respectively.

Figure 15:
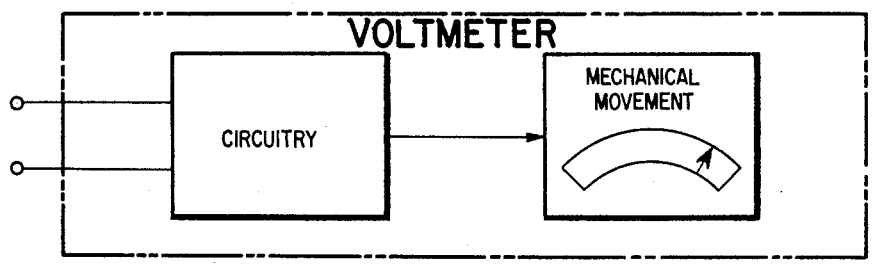

Fig. 15 is a diagrammatic representation of an ordinary voltmeter.

Figure 16:
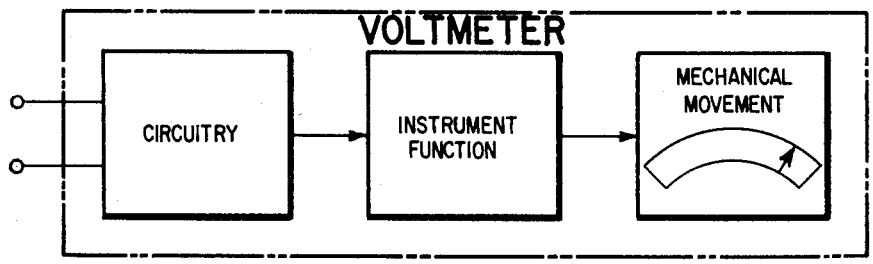

Fig. 16 is a diagrammatic representation of a voltmeter including an instrument function.

Before explaining in detail the present invention it is to be understood that the invention is not limited in its application to the details of the diagrammatic arrangements and circuitry illustrated in the accompanying drawings, since the invention is capable of other embodiments and of being practiced or carried out in various ways. Also it is to be understood that the phraseology or terminology employed herein is for the purpose of description and not of limitation.

Figure 1:
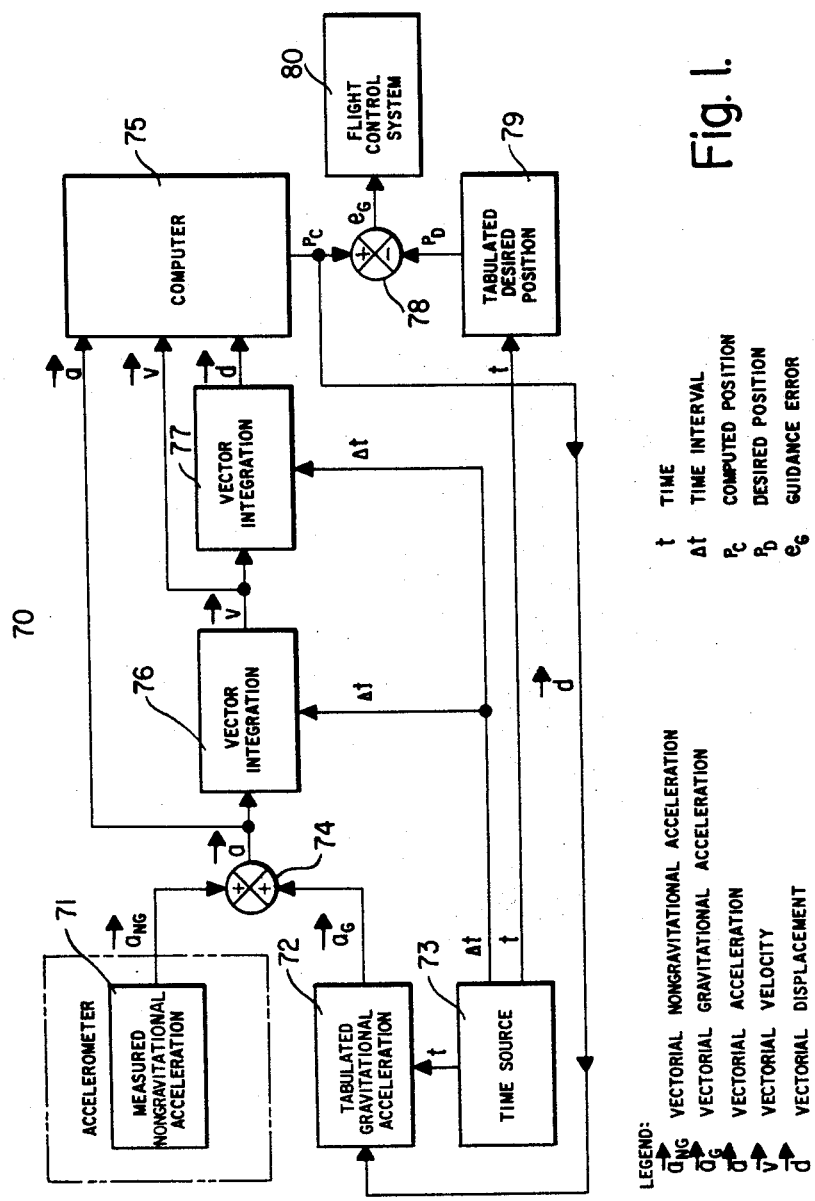
Fig. 1 is a diagrammatic representation of a simplified inertial navigation system.

The principles of the present invention were derived as the result of a re-evaluation of the fundamental premises upon which present accelerometer design is based, particularly with regard to accelerometers utilized in inertial navigation. In an inertial navigation system, acceleration is measured with some type of an instrument. A simplified block diagram version of an inertial navigation system is shown in Fig. 1 and will be explained a little later. Velocity is obtained as the time integral of acceleration and, with the velocity known, position can be determined in a conventional dead reckoning manner by a second step of integration. A continuous plot of position can then be obtained. Motion can be measured because at some point every motion is accompanied by an acceleration. The fundamental law on which all mechanics is based involves acceleration. Newton's second law states that force is equal to the time-rate-of-change of momentum, without approximation or correction for any effect. When the mass is constant, the force is equal to the mass times the acceleration ($F=ma$). In order to eliminate an energy exchange between the vehicle and a reference located outside the vehicle, an inertial mass is carried within the vehicle for reference. By measuring the forces and torques acting on the inertial mass, it is possible to deduce the acceleration of the mass, which, of course, is the same as the acceleration of the vehicle. Here then, is a fundamental effect, true without approximation, upon which a navigation system may be based. Such a system will not have inherent accuracy limitations. Unlike any previously used scheme for airborne navigation, this system would have absolutely no error. Provided that the instruments and gravitational information are perfect, accuracy would not be affected by wind, aircraft maneuvers, magnetic storms, enemy jamming, or any other outside disturbance.

The motion of a vehicle can be resolved into a translation of the mass center plus a rotation about the mass center, both referred to the navigational coordinates. The vehicle is acted upon by gravitational forces and by non-gravitational forces, and by torques arising from the aerodynamic and propulsive effects. The total acceleration of the vehicle is the sum of the measurable non-gravitational acceleration and the non-measurable gravitational acceleration. Since the gravitational forces act in exactly the same way on both the vehicle and in the inertial mass, no force or motion can develop between them. Consequently, the accelerometer cannot measure the gravitational acceleration. The latter must be a known function of time and position in the navigational coordinates.

Referring now to Fig. 1 in which a simplified block diagram version of an inertial guidance system is illustrated, the system generally designated 70 comprises an accelerometer 71 for measuring non-gravitational acceleration, $\vec{a}_{NG}$ a data storage unit 72 containing tabulated gravitational acceleration data; and a time source 73 for continuously coordinating the desired flight path and the gravitational data along the flight path with the elapsed flight time. The gravitational acceleration is derived from previously tabulated data and is added to the system as a function of position and time. The circle 74 represents the summation point of the measured non-gravitational acceleration $\vec{a}_{NG}$ and the tabulated gravitational acceleration $\vec{a}_G$. These quantities are summed to obtain the total acceleration acting on the vehicle. Vectorial quantities are shown since the flight path is three dimensional. The acceleration data is illustrated as being fed directly into a computer 75. However, since velocity is the time integral of acceleration the velocity vector $\vec{v}$ is shown as being derived from a vector integration unit 76 from which it is fed into the computer 75. Similarly, since displacement is the time integral of velocity, a second vector integration unit 77 is shown from which the displacement vector $\vec{d}$ is obtained. The function of the computer 75 is to calculate the instantaneous position as well as the future position of the vehicle from the vectorial acceleration, velocity and displacement data. At a comparison point 78 the computed position $P_C$ is compared with the position desired, $P_D$, as a function of elapsed flight time. Any guidance errors $e_G$, between the vehicle flight path and the desired flight path, as represented by the diagram box 79 labelled "Tabulated Desired Position," are fed to the flight control system 80 for correction of the vehicle flight path.

The requirements of a navigational accelerometer depend upon the vehicle, its mission, the navigation system, the acceleration environment, the desired navigational accuracy, as well as other considerations. An optimum accelerometer design would be based upon a specific system requirement. However, that the range should be large is obvious from considerations of the acceleration environment during take-off. That the resolution should be small is obvious from considerations of the acceleration environment during free fall, and the accelerations caused by low velocity winds. That the accuracy should be precise is obvious from considerations of the vehicle velocity, the duration of flight, and the distance to be navigated. For example, if a 35 mile navigational error limit is established for a three hour flight, the accelerometer must be responsive to accelerations as low as 0.001 g. A typical accelerometer must maintain this precision over an input range of 0 to 10 g. under reasonable dynamic conditions.

Since the accelerometer is basically the heart of the inertial navigation system, its size, weight, and power consumption requirements are secondary to the performance requirements.

Any physical form of an accelerometer possesses four elements:

(a) a mass element
(b) an elastic element
(c) a viscous damping element
(d) a Coulomb damping element Any or all of these elements may be variable or non-linear.

Figure 2:
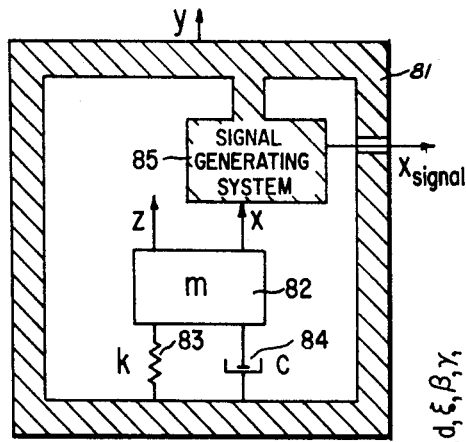
Fig. 2 is a diagrammatic representation of a single-degree-of-freedom system accelerometer with a signal generating system.

The usual accelerometer is a single-degree-of-freedom mechanical system. Such a system for lumped parameters is shown in Fig. 2 in which the accelerometer is shown as a frame 81, a mass element 82, a spring 83, a viscous damping element 84 and a signal generating system 85. Displacement of the frame is represented by the vector $y$; displacement of the inertial mass is represented by the vector $z$; and relative displacement of the inertial mass with respect to the frame is $x=z-y$. A spring force ($kx$) acts upon the mass ($m$) whenever the spring is deflected. The viscous damping ($c$) provides a resistive force proportional to the velocity.

The signal generating system 85 is provided to indicate the relative motion ($x$) of the internal mass with respect to the frame. This relative motion is taken as a measure of the acceleration ($d^2y/dt^2$) of the frame.

Coulomb friction arises from the sliding of dry surfaces. The Coulomb friction force is nearly constant and depends on the nature of the sliding surfaces and the normal force between them. Since Coulomb damping would contribute toward hysteresis, zero offset, and drift in the velocity and displacement calculations, it is not considered in the following equations of motion. Every means must be taken to eliminate Coulomb damping from an accelerometer to be used for inertial navigation applications.

The equation of motion for the above illustrated system, the effect of Coulomb friction being considered zero is:

$$m\left(\frac{d^2z}{dt^2}\right)+c\left(\frac{dz}{dt}-\frac{dy}{dt}\right)+k(z-y)=0 \qquad (21)$$

With $z$ equal to $x$ plus $y$, Equation 21 becomes:

$$m\left(\frac{d^2x}{dt^2}\right)+c\left(\frac{dx}{dt}\right)+kx=-m\left(\frac{d^2y}{dt^2}\right) \qquad (22)$$

$$\frac{d^2x}{dt^2}+\frac{c}{m}\left(\frac{dx}{dt}\right)+\frac{kx}{m}=-\frac{d^2y}{dt^2} \qquad (23)$$

By making the following substitutions:

$k/m=\omega_n^2$ (natural frequency expressed in radians)
$c_c=2\sqrt{mk}$ (critical value of damping coefficient)
$\zeta=c/c_c$ (damping ratio)

Equation 23 becomes:

$$\frac{d^2x}{dt^2}+2\zeta\omega_n\left(\frac{dx}{dt}\right)+\omega_n^2x=-\frac{d^2y}{dt^2} \qquad (24)$$

The equation of motion does not indicate an optimum value of the damping ratio ($\zeta$), nor does it indicate to what accuracy $x$ must be measured in order to obtain a given accuracy in $y$.

For static acceleration conditions:

$$\frac{d^2x}{dt^2}=\frac{dx}{dt}=0 \qquad (25)$$

Consequently:

$$\omega_n^2 x_s=-A_s \qquad (26)$$

where $x_s$ is the static displacement and $A_s$ is the static acceleration. By assuming these static conditions, information concerning the resolution or minimum detectable acceleration can be obtained from a study of Equation 26. The static sensitivity is given by the relative displacement ($x$) of the internal mass with respect to the frame divided by the acceleration sustained by the frame, i.e., sensitivity is equal to $x/A$. From Equation 26 it can be seen that the sensitivity, $x/A$, is equal to $1/\omega_n^2$. Since the substitution $k/m$ is equal to $\omega_n^2$ has been made, the sensitivity is equal to $m/k$. Thus, if a weak spring is used ($k$ is small), the sensitivity is large. A weak spring results in a low natural frequency and since a conventional accelerometer can be accurately used only over a portion of the natural frequency range, a weak spring accelerometer is accurate only at low frequencies. Conversely, if accuracy is desired over a broad range of frequencies the spring is made stiffer than before and the sensitivity is decreased.

When the accelerometer is subjected to a forced vibration, the output oscillates. In the text, Mechanical Vibrations, page 66, W. T. Thomson, Prentice Hall, New York, the amplitude of the vibration is graphically illustrated with respect to the zero frequency deflection. The response of the accelerometer is plotted in non-dimensional form, which is referred to as the magnification factor. Thus, if the zero frequency deflection is increased, the sinusoidal response to a forced vibration is also increased. Thus, when the natural frequency of the accelerometer is low, the sensitivity is high and the resolving power of the accelerometer is improved. This equation shows that the sensitivity at any frequency is inversely proportional to the square of the natural frequency so as to be able to measure a larger range of imposed acceleration frequencies results in a greatly reduced sensitivity. It can be seen then, that the resolving power of the accelerometer is improved when its natural frequency is low.

To make the analysis more useful, Equation 24 is written in dimensionless form by making the following substitutions:

$$\left.\begin{array}{l}\tau=t/T \text{ (time ratio)}\\ R=T_n/T \text{ (natural period to pulse duration ratio)}\end{array}\right\} (27)$$

$$\left.\begin{array}{l}a=d^2y/dt^2/(d^2y/dt^2)_{\max.} \text{ (acceleration ratio)}\\ \xi=-\omega_n^2 x/(d^2y/dt^2)_{\max.}\\ \qquad \text{(acceleration response ratio)}\end{array}\right\} (28)$$

Where:

$T=$duration of acceleration pulse to be measured
$T_n=2\pi/\omega_n$ (natural period of accelerometer)
$(d^2y/dt^2)_{\max.}=$peak value of acceleration Substituting Equations 27 and 28 in Equation 24 gives:

$$\left(\frac{R}{2\pi}\right)^2\left(\frac{d^2\xi}{d\tau^2}\right)+\left(\frac{R\zeta}{\pi}\right)\left(\frac{d\xi}{d\tau}\right)+\xi=a \qquad (29)$$

To perform the navigational function, the system requires information concerning the velocity ($V$) and displacement ($D$) associated with the acceleration ($A$). As previously indicated, the velocity is the time integral of the acceleration, and the displacement is the time integral of the velocity.

$$V(t)=\int_0^t A(t)dt \qquad (30)$$

$$D(t)=\int_0^t V(t)dt=\int_0^t\int_0^t A(t)dtdt \qquad (31)$$

By integrating Equation 24, the velocity is found to be:

$$-\frac{dy}{dt}=\int_0^t\frac{d^2y}{dt^2}dt=\int_0^t\left(\frac{d^2x}{dt^2}+2\zeta\omega_n\frac{dx}{dt}+\omega_n^2x\right)dt \qquad (32)$$

Maintaining the dimensionless form by making the following substitutions:

$$v=\frac{(dy/dt)}{(dy/dt)_{\tau=1}} \text{ (velocity ratio)}$$

$$\beta=-\int_0^\tau \frac{\omega_n^2 x d\tau}{(dy/dt)_{\tau=1}} \text{ (velocity response ratio)} \qquad (33)$$

where $(dy/dt)_{\tau=1}$ is the value of velocity when $\tau$ is equal to one, and substituting Equations 27 and 33 into Equation 32:

$$v=\left(\frac{R}{2\pi}\right)^2\frac{d^2\beta}{d\tau^2}+\frac{R\zeta}{\pi}\frac{d\beta}{d\tau}+\beta \qquad (34)$$

The displacement, by a double integration of Equation 24, is found to be:

$$-y=\int_0^t\int_0^t-\frac{d^2y}{dt^2}dtdt=\int_0^t\int_0^t\left(\frac{d^2x}{dt^2}+2\zeta\omega_n\frac{dx}{dt}+\omega_n^2x\right)dtdt$$

$$(35)$$

The dimensionless form may be maintained by making the following substitutions:

$$d = \frac{y}{(y)_{r=1}} \text{ (displacement ratio)}$$

$$\gamma = -\int_0^\tau \int_0^\tau \frac{\omega_n^2 x d\tau d\tau}{(y)_{r=1}} \text{ (displacement response ratio)} \quad (36)$$

Substituting Equations 27 and 36 into Equation 35:

$$d = \left(\frac{R}{2\pi}\right)^2 \frac{d^2\gamma}{d\tau^2} + \frac{R\zeta}{\pi} \frac{d\gamma}{d\tau} + \gamma \quad (37)$$

R is equal to the natural period, $T_n$, divided by the pulse duration, T. Since $T_n$ is equal to $2\pi/\omega_n$ and T is equal to $2\pi/\omega$, R is also equal to $\omega/\omega_n$. Therefore, when the accelerometer used in a specific application has a natural frequency which is high compared to the frequency which would be associated with the pulses, the ratio R goes to zero. Under these circumstances, the first two terms in Equations 29, 34 and 37 become negligible, and the dimensionless acceleration response ratio ($\xi$), velocity response ratio ($\beta$), and displacement response ratio ($\gamma$) become equal to the acceleration ratio ($a$), velocity ratio ($v$) and displacement ratio ($d$) respectively. As R becomes larger, the first and second terms of these three equations start to have effect. In each case, the primary effect of the first term is to tend to make the response ratio oscillate in value below and above the value of the reference ratio. The primary effect of the second term is to introduce a time lag between the response ratio and the reference ratio.

The foregoing is graphically demonstrated in Figs. 3, 4 and 5 for an accelerometer having a natural period to pulse duration ratio of R equal to one and a damping ratio $\zeta$ equal to zero. The reference half sine wave acceleration and associated velocity and displacement ratios are shown by the dotted lines 86, 87 and 88 respectively of Fig. 3. The half sine wave acceleration, velocity and displacement response ratios are shown by the solid lines 89, 90 and 91, respectively. It can be seen that the response ratios oscillate first below and then above and below the reference ratio. This is primarily the effect of the first term of Equations 29, 34 and 37, respectively. An effective time lag occurs since the response ratios are shifted to the right of the reference ratios, the displacement to the right indicating that they are later in time.

The reference triangular form of acceleration and associated velocity and displacement ratios are shown by the dotted lines 92, 93 and 94 respectively of Fig. 4. The triangular acceleration, velocity and displacement response ratios are shown by the solid lines 95, 96 and 97 respectively.

The reference ratios for the square form of acceleration are shown by the dotted lines 98, 99 and 100 while the corresponding response ratios are shown by the solid lines 101, 102 and 103, respectively, of Fig. 5.

With reference to Equation 29, so that the response, $\xi$, of the accelerometer reproduces the time history of the applied acceleration, $a$, seismographic systems are operated in their "accelerometer range," i.e., R is made small so that the first two terms, the dynamic terms, are minimized. Minimizing these two terms is considered desirable since, as was stated above, the first term $$\left(\frac{R}{2\pi}\right)^2 \left(\frac{d^2\xi}{d\tau^2}\right)$$

tends to make the response $\xi$ oscillate in value above and below the value of the acceleration $a$ and the second term $$\left(\frac{R\zeta}{\pi}\right)\left(\frac{d\xi}{d\tau}\right)$$

introduces a time lag between the response $\xi$ and the acceleration $a$.

Thus, a contradiction exists in that to improve the resolving power of the accelerometer its natural frequency should be small thereby making R large; while to ensure that the response faithfully reproduces the time history of transient accelerations the accelerometer frequency should be large thereby making R small. In the conventional accelerometer design, resolution is gained at the expense of a high frequency response or a high frequency response is gained at the expense of resolution.

To briefly summarize the foregoing it has been mathematically shown that the resolving power of an accelerometer is improved if its natural frequency is made lower. In extensive experimentations and calculations not described herein, the acceleration response ratios, the velocity response ratios, and displacement response ratios were compared with the acceleration ratios, velocity ratios, and displacement ratios respectively, of accelerometers with various natural period to pulse duration ratios and damping ratios. In no case did any accelerometer respond with perfect fidelity to any ratio. However, as the natural period to pulse duration (R) was made smaller, the fidelity improved. As was shown with respect to Equations 29, 34 and 37, as R is made smaller, the two dynamic terms were minimized.

The conclusion reached then is that if it is desired to improve the resolving power of the accelerometer, its natural frequency should be small; and to ensure that the acceleration response faithfully reproduces the time history of transient accelerations, the accelerometer natural frequency should be large. To repeat the statement made above, in the usual accelerometer design, resolution is gained at the expense of high frequency response or a high frequency response is gained at the expense of resolution.

The procedure of increasing the natural frequency so that the acceleration response is a faithful duplication of the acceleration is based upon an approximation. Equation 29 clearly shows that acceleration ($a$) is not equal to acceleration response ($\xi$), but is equal to three terms which are functions of acceleration response ($\xi$). It has been demonstrated by D. E. Weiss in a paper entitled "Design and Application of Accelerometers," Proc. SESA, vol. V, No. 1, 1947, that the first two terms could be computed numerically or graphically from the response when they could not be ignored. Another worker in the field, W. P. Welch, performed numerical integrations and summations to show the value of using the three terms to compute the displacement of the accelerometer, and indicated that the time required to evaluate a shock record could be materially reduced by the development of a machine. (P. A. Welch, "A Proposed New Shock Measuring Instrument," Proc. SESA, vol. V, No. 1, p. 39 (1947).)

The present invention is directed to an instrument function ($F_I$) which instantaneously and continuously computes and sums the three terms which are functions of ($\xi$). An instrument function is a device which, when placed in a predetermined relationship with an instrument or device results in predetermined dynamic characteristics. Ideally, the instrument function dynamic characteristics are equivalent to the reciprocal of the instrument or devices dynamic characteristics before any secondary mathematical operations are performed thereon (see Fig. 8, case I). However, under some conditions it may be desirable to perform the secondary mathematical operations simultaneously while compensating for the instrument characteristics (see Fig. 8, cases II and III). For example, under certain conditions, the use of instrument functions allows more of the accelerometer frequency range to be used. The increased frequency range can be utilized to measure higher frequency accelerations more precisely, or it may allow the restricted sensitivity to be regained.

The conditions which determine to what extent the instrument function can be used to extend the useful frequency range depend upon the amplitude and frequency spectrum of the noise added to the signal by the signal generating system. The tendency of the instrument function to amplify the noise can be controlled by incorporating filters in the circuit.

Theory

As discussed above, the equation of motion of the internal mass with respect to the frame of a single-degree-of-freedom accelerometer (Equation 24) is:

$$\frac{d^2x}{dt^2}+2\zeta\omega_n\frac{dx}{dt}+\omega_n^2 x=-\frac{d^2y}{dt^2} \quad (24)$$

In this discussion the mathematics is expressed in the notation of the Laplace transform so that algebraic operations may be substituted for calculus operations. To transform an ordinary differential equation with constant coefficients (Equation 24), the four following theorems for the $\mathcal{L}$ transformation of operations will be needed: (a) multiplication of a function by a constant; (b) a sum of functions; (c) the derivative of a function; and (d) the integral of a function. These theorems apply to the special case where the initial conditions are zero.

Linearity theorem $$\mathcal{L}[af(t)]=aF(s) \quad (38)$$

$$\mathcal{L}[f_1(t)\pm f_2(t)]=F_1(s)+F_2(s) \quad (39)$$

Real differentiation theorem $$\mathcal{L}\left[\frac{df(t)}{dt}\right]=sF(s) \quad (40)$$

$$\mathcal{L}\left[\frac{d^2f(t)}{dt^2}\right]=s^2F(s) \quad (41)$$

Real integration theorem $$\mathcal{L}[\int f(t)dt]=\frac{F(s)}{s} \quad (42)$$

$$\mathcal{L}[\int\int f(t)dtdt]=\frac{F(s)}{s^2} \quad (43)$$

Using these theorems, Equation 24 can be written:

$$(s^2+2\zeta\omega_n s+\omega_n^2)X(s)=Y(s) \quad (44)$$

Using the acceleration response ratio ($\xi$), defined in Equation 28 as a measure of the accelerometer output, the dynamic characteristics or transfer function ($G_A$) can be given in terms of the ratio of the output to the input as:

$$G_A(s)=\frac{\Xi}{Y}(s)=\frac{1}{\frac{s^2}{\omega_n^2}+\frac{2\zeta s}{\omega_n}+1} \quad (45)$$

As previously indicated, the instrument function ($F_I$) is a device which, when placed in series with the signal generating system, results in total dynamic characteristics of unity. Ideally, $$F_I(s)=\frac{1}{G_A}(s) \quad (46)$$

$$G_A(s)F_I(s)=1 \quad (47)$$

System dynamic characteristics of unity are desirable, since this effectively means an infinite frequency response, no phase shift, and perfect fidelity. Each component, though, maintains its individual response characteristics.

There are as many ideal internal arrangements of the instrument function as there are outputs to the system.

An inertial navigation system having the three system outputs $\xi$, $\beta$, and $\gamma$ is shown in the simplified block diagram of Fig. 6.

Consequently, there are three possible arrangements for the instrument function. These three arrangements, identified as case I, II and III, are shown in Fig. 7, where the dynamic characteristics of each block are expressed in the Laplace transform notation.

The instrument function for case I is designed to obtain total dynamic characteristics of unity. The case I instrument function equation for an accelerometer whose dynamic characteristics are represented by a second order differential equation is shown in Fig. 7, case I, as $$F_I(s)=\frac{s^2}{\omega_n^2}+\frac{2\zeta s}{\omega_n}+1$$

which can be written as $$F_I(s)=K_0+K_1 s+K_2 s^2$$

where $$K_0=1$$

$$K_1=\frac{2\zeta}{\omega_n}$$

$$K_2=\frac{1}{\omega_n^2}$$

The instrument function equation for an instrument or device whose dynamic characteristics are unity may be expressed in general terms as a differential equation of the $n$th order, as follows:

$$F_I(s)=1+K_1 s+K_2 s^2+\ldots K_n s^n$$

The instrument function for case II is designed to obtain total dynamic characteristics of $1/s$. The case II instrument function equation for an accelerometer whose dynamic characteristics are represented by a second order differential equation is illustrated in Fig. 7, case II and is as follows:

$$F_I(s)=\frac{s}{\omega_n^2}+\frac{2\zeta}{\omega_n}+\frac{1}{s}$$

which may be written $$F_I(s)=K_2 s+K_1+K_0 s^{-1}$$

The instrument function equation for an instrument or device whose dynamic characteristics are as established with respect to case II may be expressed in general terms as a differential equation of the $n$th order as follows:

$$F_I(s)=s^{-1}+K_1+K_2 s+\ldots K_n s^{n-1}$$

The instrument function for case III is designed to obtain total dynamic characteristics of $1/s^2$. The case III instrument function equation for an accelerometer whose dynamic characteristics are represented by a second order differential equation is given in Fig. 7, case III as $$F_I(s)=\frac{1}{\omega_n^2}+\frac{2\zeta}{\omega_n s}+\frac{1}{s^2}$$

which may be written $$F_I(s)=K_2+K_1 s^{-1}+K_0 s^{-2}$$

The case III instrument function equation for an instrument or device whose dynamic characteristics are represented by an $n$th order differential equation may be expressed $$F_I(s)=s^{-2}+K_1 s^{-1}+\ldots K_n s^{n-2}$$

From the foregoing it may be seen to follow that the instrument function for case N is designed to obtain total dynamic characteristics of $1/s^n$. The case N instrument equation follows directly from the previous examples, as follows:

$$F_I(s)=s^{-n}+K_1 s^{-n+1}+K_2 s^{-n+2}+\ldots K_n s^{-n+n}$$

The acceleration response ratio, velocity response ratio, and displacement response ratio computed with an instrument function are indicated by $\xi_{FI}$, $\beta_{FI}$, and $\gamma_{FI}$, respectively.

The equivalence of the methods can be demonstrated by writing the transfer function for one quantity $$(\xi_{FI}/\xi)(s)$$

For case I:

$$\frac{\xi_{F_I}}{\xi}(s) = \frac{s^2}{\omega_n^2} + 2\zeta\frac{s}{\omega_n} + 1 \qquad (48)$$

For case II:

$$\frac{\xi_{F_I}}{\xi}(s) = \left(\frac{s}{\omega_n^2} + \frac{2\zeta}{\omega_n} + \frac{1}{s}\right)(s) = \frac{s^2}{\omega_n^2} + 2\zeta\frac{s}{\omega_n} + 1 \qquad (49)$$

For case III:

$$\frac{\xi_{F_I}}{\xi}(s) = \left(\frac{1}{\omega_n^2} + \frac{2\zeta}{s\omega_n} + \frac{1}{s^2}\right)(s)(s) = \frac{s^2}{\omega_n^2} + \frac{2\zeta s}{\omega_n} + 1 \qquad (50)$$

The equivalence of the other two transfer functions, $\beta_{F_I}/\xi(s)$ and $\gamma_{F_I}/\xi(s)$ can be similarly shown. Functional block diagrams which illustrate how the three cases may be instrumented are presented in Fig. 8.

*Functional block diagram*

The illustration of the system is shown in functional block diagram form since the computer art abounds with practical methods of performing summation, polarity changing, integration, differentiation and filtering. These means are described in the computer art and need not be described in detail here. Functional block diagrams are used since the computations can be performed using, for example, electrical, mechanical, electro-mechanical, chemical and hydraulic methods. Also, the computations may be performed by analog or digital techniques. Methods of performing summation, polarity changing, integration and differentiation are given in the books "Analog Computer Techniques" by Clarence L. Johnson, McGraw-Hill, 1956; "Analog Methods in Computation and Simulation" by Walter W. Soroka, McGraw-Hill, 1954; and "Electronic Analog Computers" by Gianino A. Korn and Theresa M. Korn, McGraw-Hill, 1956.

*Practical limitations*

The signal generating system of the accelerometer accomplishes the mechanical motion to electrical signal conversion. Inherent in any equipment are random, spurious, undesirable signals termed noise. Much work has been done to determine the source of this noise and to develop methods of solving noise problems. Techniques have been developed which reduce the magnitude of this noise.

Since digital computing elements are less sensitive to noise, they would be desirable in this application. However, since noise is inherent in any signal generating system, a certain amount persists. In this discussion, it will be assumed that the noise in the computing elements has been reduced to negligible proportions. The noise added by the accelerometer signal generating system is treated as a separate noise generator in Fig. 9. The sensitivity to noise of the computing circuitry located between points A and B, A and C, and A and D is plotted. The sensitivity of the network between points A and B is unity throughout the frequency spectrum. The sensitivity between A and C is determined by the dynamic characteristics of an integrator. The transfer function of an integrator is given by:

$$G(s) = \frac{1}{s} \qquad (51)$$

This transfer function can be written in the frequency domain as:

$$G(j\omega) = \frac{1}{j\omega} \qquad (52)$$

As shown by this equation, and plotted in Fig. 16, an integrator is sensitive to low frequency signals. The transfer function of the two integrators in series between points A and D is:

$$G(j\omega) = \frac{1}{(j\omega)^2} \qquad (53)$$

This function is especially sensitive to low frequency noise. Both integrators discriminate against high frequency noise. However, drift, a special case of low frequency noise, could overload the integrator outputs before a quarter of the noise cycle occurs.

The sensitivity to noise between the same points in computing circuitry containing an ideal instrument function is plotted in Fig. 10. The noise sensitivity of the three instrument function cases is identical for ideal computing elements. The instrument function design plotted assumes an accelerometer with $\omega_n$ equal to one and $\zeta$ equal to 0.7. It is to be noted that the instrument function increases the circuit sensitivity to noise by 40 decibels per decade in the range greater than $\omega_n$. The low frequency noise sensitivity is not changed.

The additional sensitivity to high frequency noise of the computing circuitry, including an instrument function, constitutes a practical limitation to its use.

The instrument function of the first case requires two differentiation processes in series; the second requires one differentiation and one integration process; and the third requires two integration processes in series. These instrument functions in combination with their respective external computing elements have been shown to result in identical systems. Mathematically, the three systems are adequate. From engineering considerations, however, the process of differentiation has a serious drawback.

Differentiation is a "peaking process" (i.e., it serves to accentuate irregularities in a function being differentiated). Such irregularities are usually due to the noise which, however slight, results in a higher noise level when differentiation is used. Integration, on the other hand, is a smoothing process which averages out the irregularities caused by high frequency noise. Thus, differentiation is a noise amplifying process. It will be shown later that the noise amplification can be controlled by incorporating a filter in the differentiator. Filtering is a task which both communications and control systems must perform to separate as well as possible a desired signal input from an extraneous signal introduced at the input or within the system itself. Thus if $s(t)$ is a time varying signal representing the useful information fed into a device and $Q(t)=s(t)+n(t)$ is the total input signal, we may ask that the device yield $s(t)$ as an output. The process described is often called smoothing because in many instances $n(t)$ has higher frequency components than $s(t)$, and the removal of $n(t)$ actually amounts to smoothing the graph of the signal. A classical example of this is the effect of audio-frequency filters on a rectified, modulated radio wave. The above discussion and methods of dealing with noise are given in the book "Random Processes in Automatic Control" by J. Halcombe Loning, Jr. and Richard H. Batten, McGraw-Hill, 1956.

The filter time constant T is given the notation (1–K) in the discussion of approximate differentiation given on page 97 of "Analog Computer Techniques" supra. While a first order lag filter circuit will be used in the discussion to follow, a different form of lag or lead-lag circuit may be applicable to a specific application.

The dynamic characteristics of a differentiator and filter unit can be expressed as:

$$\frac{E_0}{E_{in}}(s) = \frac{s}{1+Ts} \qquad (54)$$

where T is the time constant of the filter. In actual use the filter time constant will depend upon the signal-to-noise frequency as well as amplitude ratios. A practical instrument function, then, is one that contains differentiators with filters, instead of pure differentiators. The three cases of instrument functions previously developed have different dynamic characteristics and sensitivities to noise when filters are included with the differentiators. The dynamic characteristics of the three forms of practical instrument functions can be written by inspection of Figs. 7 and 8.

The equations for the instrument function acceleration response ratio ($\xi_{F_I}$) for the case of pure differentiators can be written from Equation 48.

Ideal:

$$\xi_{F_I}(s) = \xi(s)\left(\frac{s^2}{\omega_n^2} + 2\zeta\frac{s}{\omega_n} + 1\right) \quad (55)$$

The equations of $\xi_{F_I}$ for each case with practical differentiators are:

For case I:

$$\xi_{F_I}(s) = \xi(s)\left(\frac{s}{(1+T_1s)}\frac{s}{(1+T_2s)}\frac{1}{\omega_n^2} + \frac{s}{(1+T_1s)}\frac{2\zeta}{\omega_n} + 1\right) \quad (56)$$

First writing case II for $\beta_{F_I}$ by inspection:

$$\beta_{F_I}(s) = \xi(s)\left(\frac{s}{(1+T_1s)}\frac{1}{\omega_n^2} + \frac{2\zeta}{\omega_n} + \frac{1}{s}\right) \quad (57)$$

Noting that:

$$\xi_{F_I}(s) = \beta_{F_I}\frac{s}{(1+T_2s)} \quad (58)$$

Then case II becomes:

$$\xi_{F_I}(s) = \xi(s)\frac{s}{(1+T_2s)}\left(\frac{s}{(1+T_1s)}\frac{1}{\omega_n^2} + \frac{2\zeta}{\omega_n} + \frac{1}{s}\right) \quad (59)$$

Writing case III for $\gamma_{F_I}$ by inspection:

$$\gamma_{F_I}(s) = \xi(s)\left(\frac{1}{\omega_n^2} + \frac{2\zeta}{s\omega_n} + \frac{1}{s^2}\right) \quad (60)$$

Noting that:

$$\xi_{F_I}(s) = \gamma_{F_I}(s)\frac{s}{(1+T_1s)}\frac{s}{(1+T_2s)} \quad (61)$$

Then case III becomes:

$$\xi_{F_I}(s) = \xi(s)\frac{s^2}{(1+T_1s)(1+T_2s)}\left(\frac{1}{\omega_n^2} + \frac{2\zeta}{s\omega_n} + \frac{1}{s^2}\right) \quad (62)$$

Similarly, the equations for $\beta_{F_I}$ and $\gamma_{F_I}$ using practical differentiators can be written. A summary of these equations appears in Fig. 11. The form of the equations has been re-arranged to better indicate the error terms. It can be seen that the case III displacement dynamic characteristics are identical to those of the ideal displacement without regard for the value of the filter time constant. The case III velocity characteristics differ from those of the ideal velocity by a first order lag, while the characteristics of case III acceleration differ from those of the ideal acceleration by a second order lag.

Each of the other cases differs from the ideal by an error term as well as a first or second order lag circuit. The error terms are functions of the filter time constants, as well as the accelerometer characteristics. Those computations which differ by only a first or second order lag circuit are delayed in time. However, the computations which differ by an error term are distorted as well.

In a navigational system, the primary information desired is displacement, while the velocity and acceleration can be considered secondary information required to stabilize and control the flight control system. Additional noise in these quantities is less serious than noise in the displacement information. Consequently, the case III instrument function might be considered superior for this application. Each case should be considered for a particular system, though, since the instrument function performance depends upon the characteristics of the noise. Also, a particular system may require that the precision of the velocity or acceleration measurement be emphasized. The case I instrument function would be more satisfactory when the noise frequency spectrum was below $\omega_n$. The case II instrument function would be more satisfactory when the noise frequency spectrum was around $\omega_n$. The dynamic characteristics of the three cases for various filter time constants will be presented and discussed later.

To demonstrate the value of the instrument function, a set of response ratios ($\xi_{F_I}$, $\beta_{F_I}$, and $\gamma_{F_I}$) was computed for each form of acceleration pulse. Two instrument function cases were assigned that form of acceleration pulse which was expected to be most deleterious to accuracy. The third case was assigned the remaining acceleration pulse. The differentiation of a step function requires an infinite amplifier output. Consequently, the square acceleration pulse was assigned to the double differentiation circuit, case I. A sharp reversal of slope occurs at the apex of the triangular acceleration pulse. Therefore, the single differentiation circuit, case II, was assigned this pulse. The remaining case III instrument function was assigned the remaining acceleration pulse, that of the half sine wave. A filter time constant of T equal to $\frac{1}{10}$ was used.

The acceleration, velocity, and displacement response ratios computed with the case III instrument function for the half sine wave acceleration pulse are presented with the reference ratios in Fig. 12. The response ratios computed with the case II instrument function for the triangular acceleration pulse are presented with the reference ratios in Fig. 13. The response ratios computed with the case I instrument function for the square acceleration pulse are presented with the reference ratios in Fig. 14.

The increased fidelity of the response ratios obtained by the use of the practical instrument functions can be determined by comparing the ratios obtained with the use of the instrument function with the ratios obtained without an instrument function. The comparison herein made is based upon the difference, expressed as a percentage of full scale, between the response ratio and the ideal ratio occurring in the time ratio interval between 0 and 1.0.

The increased fidelity of the response ratios by the use of the case III practical instrument function can be determined from the response ratios associated with the half sine wave pulse of acceleration used in Fig. 12 and Fig. 3. The displacement response ratio obtained with the instrument function, $\gamma_{F_I}$, is identical to the ideal displacement ratio, $d$. This was expected from the equations shown in Fig. 11, and occurred as shown in Fig. 12 wherein curve 106 is superimposed over curve 88. It is to be emphasized that the displacement response ratio is exact regardless of the filter time constant used with the instrument functions. Without the instrument function, the displacement response ratio, curve 91, is in error by 13 percent, as shown in Fig. 3. The associated velocity ratio obtained with the instrument function $\beta_{F_I}$, curve 105 of Fig. 12, exhibited a lag due to the single filter used and is in error with respect to the reference velocity ratio, $v$, curve 87, by 3.5 percent. Without the instrument function, the velocity response ratio, curve 90 of Fig. 3, is in error with respect to the reference velocity ratio, curve 87, by 32 percent. The associated acceleration response ratio obtained with the instrument function $\xi_{F_I}$, curve 104 of Fig. 12, is low in peak magnitude from the reference acceleration ratio, $a$, curve 86, by one percent and delayed in time by 5 percent. The aceleration response ratio is delayed longer than the velocity ratio since a double filter is used as indicated by the equations of Fig. 11. Without the instrument function, the acceleration response ratio, curve 89 of Fig. 3, is in error with respect to the ideal response ratio by 44 percent.

The increased fidelity of the response ratios obtained by the use of the case II practical instrument function can be determined from the response ratio associated with the triangular pulse of acceleration used in Fig. 13 and Fig. 4. The response ratios shown in Fig. 13 vary from the ideal response ratios by the error term shown in the table of equations of Fig. 11, in addition to the lag due to the filters. Although the three response ratios are in error, the errors obtained using the case II practical instrument function are less than those obtained without the instrument function. The displacement and velocity response ratios differ from the ideal response ratios by an error term as well as a first order lag. The displacement response ratio obtained with an instrument function, $\gamma_{F_I}$, curve 109 of Fig. 13, differs from the reference displacement ratio, $d$, curve 94, by 2 percent while the displacement response ratio, curve 97 of Fig. 4, obtained without an instrument function differs from the reference displacement ratio, curve 94, by 15 percent. The associated velocity response ratio obtained with the instrument function, $\beta_{F_I}$, curve 108 of Fig. 13, differs from the reference velocity ratio, $v$, curve 93, by approximately 5 percent. Without the instrument function, the velocity response ratio, curve 96 of Fig. 4, differs from the reference velocity ratio, curve 93, by 40 percent. The associated acceleration response ratio obtained with the instrument function, $\xi_{F_I}$, differs from the reference acceleration ratio, $a$, by 16 percent as indicated from a comparison of curves 107 and 92 of Fig. 13. Without the instrument function, the acceleration response ratio, curve 95, differs from the reference acceleration, curve 92, ratio by 100 percent as shown in Fig. 4. The increased lag of the acceleration response ratio obtained with the instrument function, $\xi_{F_I}$, over the lag exhibited by the velocity and displacement response ratios, $\beta_{F_I}$ and $\gamma_{F_I}$, respectively, is expected from the equations of Fig. 11 since the quantity displays a second order lag.

The increased fidelity of the response ratios obtained by the use of the case I instrument function can be determined from the response ratios associated with the square pulse of acceleration used in Figs. 14 and 5. The use of the case I instrument function to obtain the response ratios associated with the square acceleration pulse gives better than expected results. It has been previously indicated that the differentiation of a step input would require an infinite output from the differentiator. In the case I instrument two differentiators in series are used. However, the step input is smoothed by the accelerometer mass relative motion before entering the instrument function. The voltmeter mechanism of another application of an instrument function to be hereinafter described would similarly smooth any noise amplified by an instrument function placed before it.

Referring to Fig. 14, the response ratios vary from the reference response ratios by the error term shown in the equations of Fig. 11, in addition to the lag due to a second order filter. Although the three response ratios are again in error, the errors obtained with the case I practical instrument function are less than those obtained without the instrument function. The displacement response ratio obtained with the instrument function, $\gamma_{F_I}$, curve 112 of Fig. 14, differs from the reference displacement ratio, $d$, curve 100, by 1.5 percent while the displacement response ratio, curve 103 of Fig. 3 differs from the reference displacement ratio, curve 100, by 10 percent. The velocity response ratio obtained with the instrument function, $\beta_{F_I}$, curve 111, differs from the reference velocity response, $v$, curve 99 by 4 percent as compared with a difference of 16 percent as shown by a comparison of curves 102 and 99 of Fig. 5. The acceleration response ratio obtained with the instrument function, $\xi_{F_I}$, curve 110 of Fig. 14, differs from the reference acceleration ratio, $a$, curve 98, by 22 percent (except at $\tau$ equal to 0 where the difference must be 100 percent) as compared to a 100 percent difference between the acceleration response ratio, curve 101, and the reference response ratio, curve 98, as shown in Fig. 5.

With a knowledge of the dynamic characteristics of the instrument functions, the increased sensitivity to noise for a given noise spectrum as well as the increased useful operating range for a given navigational accelerometer-computing system can be predicted.

Without an instrument function it has been shown that no response ratio coincided perfectly with any ideal response ratio (see Figs. 3, 4 and 5). It has also been shown that the displacement response ratio obtained by the use of a case III instrument function is ideal (see Fig. 12). Further, the ideal displacement response is obtained without regard for filter time constants or without noise amplification beyond unity gain as shown in Fig. 10. Also, it has been shown that the use of any of the three instrument functions results in a more faithful reproduction of the measurement.

An advantage of the instrument function is to increase the frequency range of any given accelerometer. This range extension can be used to measure higher frequencies or to improve the resolving power of the instrument, the median frequency being established by the application.

While application to an accelerometer is discussed specifically, it should be noted that the use of an instrument function is general, and can be applied whenever the dynamic characteristics of the system are known. Also, the instrument function can be located anywhere in the signal chain, either before or after the instrument. As an example, when the system output is represented by the motion of a pointer mechanism before a scale, the instrument function for the system would located previous to the pointer mechanism in the signal chain. This has an advantage in that the noise amplified by the instrument function is smoothed by the pointer mechanism.

The foregoing may be illustrated by applying the principles of the present invention to a voltmeter. The output of a voltmeter is the movement of a mechanical device across a scale, assuming an electrical input. This is in contrast to the accelerometer system in which the input is a mechanical input and the output signal is electrical.

A simplified block diagram of a voltmeter is illustrated in Fig. 15. When the dynamic characteristics of the circuitry and mechanical movement are known an instrument function may be designed and located in the signal chain. In this particular example, the instrument function would be placed before the meter movement since its deflection is desired for the output. The new meter system is illustrated in Fig. 16.

To limit the noise amplification in the accelerometer system output, electrical filters were provided with the differentiator components. In the present instance, the dynamic characteristics of the mechanical movement are of the same identical form as an electrical filter. The present system has the advantage that any noise generated in the system which is amplified by the instrument function is smoothed by the mechanical mechanism. Additional filters may or may not be required. In the accelerometer system, the noise source is located after the mechanical device (see Figs. 9 and 10) so that additional filters were required to limit the noise.

I claim:

1. In combination, a device whose dynamic characteristics can be expressed by a second order differential equation, and an apparatus for modifying and correcting the output of said device, said device comprising a first differentiating unit for differentiating the device output, a first means for performing mathematical operations on said differentiated output comprising a means for reversing the polarity of said differentiated output and a means for multiplying said differentiated signal by the quantity $$\frac{2\zeta}{\omega_n}$$

where $\zeta$ is the damping ratio of said device and $\omega_n$ is the natural frequency of said device, a second means for performing mathematical operations on said differentiated output comprising a second differential unit for differentiating said differentiated output a second time and a means for multiplying said twice differentiated output by $$\frac{1}{\omega_n^2}$$

and means for summing said first and second means outputs with the original output of the device to provide a compensated output for said device.

2. In combination, a device whose dynamic characteristics can be expressed by a second order differential equation, and an apparatus for modifying and correcting the output of said device, said apparatus comprising a first differentiating unit for differentiating the device output, a first means for performing mathematical operations on said differentiated output comprising a means for reversing the polarity of said differentiated output and a means for multiplying said differentiated output by the quantity $$\frac{2\zeta}{\omega_n}$$

where $\zeta$ is the damping ratio of said device and $\omega_n$ is the natural frequency of said device, a second means for performing mathematical operations on said differentiated output comprising a second differential unit for differentiating said differentiated output a second time and a means for multiplying said twice differentiated output by $$\frac{1}{\omega_n^2}$$

and means summing said first and second means outputs with the original output of the device to provide a compensated output for said device, said differentiating units being provided with filtering means to reduce the effect of noise therein.

3. In combination, a device whose dynamic characteristics can be expressed by a second order differential equation, and an apparatus for modifying and correcting the output of said device, said device comprising a first differentiating unit for differentiating the device output, a first means for performing mathematical operations on said differentiated output comprising a means for reversing the polarity of said differentiated output and a means for multiplying said differentiated output by the quantity $$\frac{2\zeta}{\omega_n}$$

where $\zeta$ is the damping ratio of said device and $\omega_n$ is the natural frequency of said device, a second means for performing mathematical operations on said differentiated output comprising a second differential unit for differentiating said differentiated output a second time and a means for multiplying said twice differentiated output by $$\frac{1}{\omega_n^2}$$

and means summing said first and second means outputs with the original output of the device to provide a compensated output for said device, and means for integrating said compensated output to provide a selective quantitative value from said device.

4. In combination, a device whose dynamic characteristics can be expressed by a second order differential equation, and an apparatus for modifying and correcting the output of said device, said apparatus comprising a first differentiating unit for differentiating the device output, a first means for performing mathematical operations on said differentiated output comprising a means for reversing the polarity of said differentiated output and a means for multiplying said differentiated output by the quantity $$\frac{2\zeta}{\omega_n}$$

where $\zeta$ is the damping ratio of said device and $\omega_n$ is the natural frequency of said device, a second means for performing mathematical operations on said differentiated output comprising a second differential unit for differentiating said differentiated output a second time and a means for multiplying said twice differentiated output by $$\frac{1}{\omega_n^2}$$

and means summing said first and second means outputs with the original output of the device to provide a compensated output for said device, and means for twice integrating said compensated output to provide a selective quantitative value from said device.

5. An apparatus for modifying and correcting the output of a device whose dynamic characteristics can be expressed by a second order differential equation, said apparatus being adapted to be placed in the output chain of said device, comprising a first means for performing mathematical operations on the device output, said first means comprising a means for reversing the polarity of said output and a means for multiplying said reversed polarity output by the quantity $$\frac{2\zeta}{\omega_n}$$

where $\zeta$ is the damping ratio of said device and $\omega_n$ is the natural frequency of said device, a second means for performing mathematical operations on the device output, said second means comprising a differentiating unit for differentiating said output and a means for multiplying said differentiated output by the quantity $$\frac{1}{\omega_n^2}$$

and a third means for performing a mathematical operation on the device output comprising an integrating unit for integrating said output, and means summing the output quantities of said first, second and third means to provide a compensated selective quantitative value from said device.

6. An apparatus for modifying and correcting the output of a device whose dynamic characteristics can be expressed by a second order differential equation, said apparatus being adapted to be placed in the output chain of said device, comprising a first means for performing mathematical operations on the device output, said first means comprising a means for reversing the polarity of said output and a means for multiplying said reversed polarity output by the quantity $$\frac{2\zeta}{\omega_n}$$

where $\zeta$ is the damping ratio of said device and $\omega_n$ is the natural frequency of said device, a second means for performing mathematical operations on the device output, said second means comprising a differentiating unit for differentiating said output and a means for multiplying said differentiated output by the quantity $$\frac{1}{\omega_n^2}$$

and a third means for performing a mathematical operation on the device output comprising an integrating unit, and means summing the output quantities of said first, second and third means to provide a compensated selective quantitative value from said device, said differentiating unit being provided with filter means to reduce the effects of extraneous noise.

7. An apparatus for modifying and correcting the output of a device whose dynamic characteristics can be expressed by a second order differential equation, said apparatus being adapted to be placed in the output chain of said device, comprising a first means for performing mathematical operations on the device output, said first means comprising a means for reversing the polarity of said output and a means for multiplying said reversed polarity output by the quantity $$\frac{2\zeta}{\omega_n}$$

where $\zeta$ is the damping ratio of said device and $\omega_n$ is the natural frequency of said device, a second means for performing mathematical operations on the device output, said second means comprising a first differentiating unit for differentiating said output and a means for multiplying said differentiated output by the quantity $$\frac{1}{\omega_n^2}$$

and a third means for performing a mathematical operation on the device output comprising an integrating unit for integrating said output, and means summing the output quantities of said first, second and third means to provide a compensated selective quantitative value from said device, and a second differentiating unit for differentiating said quantitative value to provide a second compensated quantitative value from said device.

8. An apparatus for modifying and correcting the output of a device whose dynamic characteristics can be expressed by a second order differential equation, said apparatus being adapted to be placed in the output chain of said device, comprising a first means for performing mathematical operations on the device output, said first means comprising a means for reversing the polarity of said output and a means for multiplying said reversed polarity output by the quantity $$\frac{2\zeta}{\omega_n}$$

where $\zeta$ is the damping ratio of said device and $\omega_n$ is the natural frequency of said device, a second means for performing mathematical operations on the device output, said second means comprising a first differentiating unit for differentiating said output and means for multiplying said differentiated output by the quantity $$\frac{1}{\omega_n^2}$$

and a third means for performing a mathematical operation on the device output comprising a first integrating unit for integrating said output, and means summing the output quantities of said first, second and third means to provide a compensated selective quantitative value from said device, and a second integrating unit for integrating said compensated output to provide a second selective quantitative value from said device.

9. An apparatus for modifying and correcting the output of a device whose dynamic characteristics can be expressed by a second order differential equation, said apparatus being adapted to be placed in the output chain of said device, comprising a first means for performing a mathematical operation on the device output, said first means comprising a multiplying unit for multiplying said output by the quantity $$\frac{1}{\omega_n^2}$$

where $\omega_n$ is the natural frequency of said device, and a second means for performing a mathematical operation on the device output, said second means comprising a first integrating unit for integrating the device output, said integrated output being subjected to secondary mathematical operations by a first secondary means comprising means for reversing the polarity of said integrated output and a multiplying means for multiplying said reversed polarity output by $$\frac{2\zeta}{\omega_n}$$

where $\zeta$ is the damping ratio, and a second secondary means comprising a second integrating unit to perform a second integration on said integrated output, and means summing the output quantities of said first and second secondary means with the output of said first means to provide a compensated selective quantitative output for said device.

10. An apparatus for modifying and correcting the output of a device whose dynamic characteristics can be expressed by a second order differential equation, said apparatus being adapted to be placed in the output chain of said device, comprising a first means for performing a mathematical operation on the device output, said first means comprising a multiplying unit for multiplying said output by the quantity $$\frac{1}{\omega_n^2}$$

where $\omega_n$ is the natural frequency of said device, and a second means for performing a mathematical operation on the device output, said second means comprising a first integrating unit for integrating the device output, said integrated output being subjected to secondary mathematical operations by a first secondary means comprising means for reversing the polarity of said integrated output and a multiplying means for multiplying said reversed polarity output by $$\frac{2\zeta}{\omega_n}$$

where $\zeta$ is the damping ratio, and a second secondary means comprising a second integrating unit to perform a second integration on said integrated output, and means summing the output quantities of said first and second secondary means with the output of said first means to provide a compensated selective quantitative output for said device, said output chain being provided with a differentiator unit at the compensated output end thereof to differentiate said compensated output to provide a selected quantitative value from said device.

11. An apparatus for modifying and correcting the output of a device whose dynamic characteristics can be expressed by a second order differential equation, said apparatus being adapted to be placed in the output chain of said device, comprising a first means for performing a mathematical operation on the device output, said first means comprising a multiplying unit for multiplying said output by the quantity $$\frac{1}{\omega_n^2}$$

where $\omega_n$ is the natural frequency of said device, and a second means for performing a mathematical operation on the device output, said second means comprising a first integrating unit for integrating the device output, said integrated output being subjected to secondary mathematical operations by a first secondary means comprising means for reversing the polarity of said integrated output and a multiplying means for multiplying said reversed polarity output by $$\frac{2\zeta}{\omega_n}$$

where $\zeta$ is the damping ratio, and a second secondary means comprising a second integrating unit to perform a second integration on said integrated output, and means summing the output quantities of said first and second secondary means with the output of said first means to provide a compensated selected quantitative output for said device, said signal chain being provided with a double differentiator unit at the compensated output end thereof to twice differentiate said compensated output to provide a compensated output from said device.

12. Means for obtaining total dynamic characteristics of unity integrated $n$ times for a measuring system having a measuring device whose dynamic characteristics are expressed by an nth order differential equation of the form $$G_a(s) = \frac{1}{1 + K_1 s + K_2 s^2 + \ldots K_n s^n}$$

where $G_a$ is the transfer function of the device; $(s)$ is the operational operator expressed in Laplace notation; the coefficients $K_1$, $K_2$ and $K_n$ may be set arbitrarily and independently; and $n$ is any positive integer; said means comprising an appartus for modifying and correcting the output of said device, said apparatus comprising a first means for performing mathematical operations on the output of said device, said first means comprising a means for differentiating said output once, a means for reversing the polarity of said once differentiated output, and means for multiplying said reversed polarity once differentiated output by $K_1$, a second means for performing mathematical operations on the once differentiated output, said second means comprising a means for differentiating the once differentiated output a second time and a means for multiplying the now twice differentiated output by $K_2$, and an $n$th means for performing mathematical operations on the $(n-1)$th differentiated output, comprising a means for differentiating the $(n-1)$th differentiated output an $n$th time, a means for reversing the polarity of the $n$th differentiated output only if $n$ is an odd integer, and a means for multiplying the now $n$th differentiated output by $K_n$, and an $(n+1)$th mathematical means for performing a mathematical operation, said last-mentioned mathematical means comprising a summing means for summing the original device output with the resultant of the first, second and $n$th means for performing mathematical operations, whereby the resulting output of said measuring device and apparatus provide the total dynamic characteristics of unity for the system.

13. Means for obtaining total dynamic characteristics of unity multiplied by the dynamic characteristics of secondary instrumentation for a measuring system having a measuring device whose dynamic characteristics are expressed by an $n$th order differential equation of the form $$G_a(s) = \frac{1}{1 + K_1 s + K_2 s^2 + \ldots K_n s^n}$$

where $G_a$ is the transfer function of the device; $(s)$ is the operational operator expressed in Laplace notation; the coefficients $K_1$, $K_2$ and $K_n$ may be set arbitrarly and independently; and $n$ is any positive integer; said means comprising an apparatus for modifying and correcting the output of said device, said apparatus being interposed between said device and said secondary instrumentation, said apparatus comprising a first means for performing mathematical operations on the output of said device, said first means comprising a means for differentiating said output once, a means for reversing the polarity of said once differentiated output, and means for multiplying said reversed polarity once differentiated output by $K_1$, a second means for performing mathematical operations on the once differentiated output, said second means comprising a means for differentiating the once differentiated output a second time, and a means for multiplying the now twice differentiated output by $K_2$, and an $n$th means for performing mathematical operations on the $(n-1)$th differentiated output, comprising a means for differentiating the $(n-1)$th differentiated output an $n$th time, a means for reversing the polarity of the $n$th differentiated output only if $n$ is an odd integer, and a means for multiplying the now $n$th differentiated output by $K_n$, and an $(n+1)$th mathematical means for performing a mathematical operation, said last-mentioned mathematical means comprising a summing means for summing the original device output with the resultant of the first, second and $n$th means for performing mathematical operations, whereby the resulting output of said measuring device, apparatus and secondary instrumentation provide the total dynamic characteristics of unity multiplied by the dynamic characteristics of the secondary instrumentation for the system.

14. Means for obtaining total dynamic characteristics of unity integrated once for a measuring system having a measuring device whose dynamic characteristics can be expressed by an $n$th order differential equation of the form $$G_a(s) = \frac{1}{1 + K_1 s + K_2 s^2 + \ldots K_n s^n}$$

where $G_a$ is the transfer function of the device; $(s)$ is the operational operator expressed in Laplace notation; the coefficients $K_1$, $K_2$ and $K_n$ may be set arbitrarily and independently; and $n$ is any positive integer, said means comprising an apparatus for modifying and correcting the output of said device, said apparatus comprising a first means for performing mathematical operations on the output of said device, said first means comprising a means for reversing the polarity of said output and a means for multiplying said reversed polarity output by $K_1$, a second means for performing mathematical operations on the device output comprising a means for differentiating the device output once and a means for multiplying said once differentiated device output by $K_2$, and an $n$th means for performing mathematical operations on the $(n-1)$th differentiated device output, comprising a means for differentiating the $(n-1)$th differentiated device output an $n$th time, a means for reversing the polarity of the $n$th differentiated device output if $n$ is an odd integer, and a means for multiplying said $n$th differentiated device output by $K_n$, an $(n+1)$th means for performing mathematical operations on the device output, said $(n+1)$th means comprising means for integrating the device signal, an $(n+2)$th mathematical means for performing a mathematical operation comprising a means for summing the resultant of the first, second, $n$th and $(n+1)$th means for performing mathematical operations, whereby the resulting output of said measuring instrument and apparatus provide the desired total dynamic characteristics of unity integrated once for the system.

15. Means for obtaining total dynamic characteristics of unity integrated once multiplied by the dynamic characteristics of secondary instrumentation for a measuring system having a measuring device whose dynamic characteristics can be expressed by an $n$th order differential equation of the form $$G_a(s) = \frac{1}{1 + K_1 s + K_2 s^2 + \ldots K_n s^n}$$

where $G_a$ is the transfer function of the device; $(s)$ is the operational operator expressed in Laplace notation; the coefficients $K_1$, $K_2$ and $K_n$ may be set arbitrarly and independently; and $n$ is any positive integer, said means comprising an apparatus for modifying and correcting the output of said device, said apparatus being interposed between said device and said secondary instrumentation, said apparatus comprising a first means for performing mathematical operations on the output of said device, said first means comprising a means for reversing the polarity of said output and a means for multiplying said reversed polarity output by $K_1$, a second means for performing mathematical operations on the device output comprising a means for differentiating the device output once and a means for multiplying said once differentiated device output by $K_2$, and an $n$th means for performing mathematical operations on the $(n-1)$th differentiated device output, comprising a means for differentiating the $(n-1)$th differentiated device output an $n$th time, a means for reversing the polarity of the $n$th differentiated device output if $n$ is an odd integer, and a means for multiplying said $n$th differentiated device output by $K_n$, an $(n+1)$th means for performing mathematical operations on the device output, said $(n+1)$th means comprising means for integrating the device signal, an $(n+2)$th mathematical means for performing a mathematical operation comprising a means for summing the resultant of the first, second, $n$th and $(n+1)$th means for performing mathematical operations, whereby the resulting output of said measuring device, apparatus and secondary instrumentation provides the desired total dynamic characteristics of unity integrated once multiplied by the dynamic characteristics of the secondary instrumentation for the system.

16. Means for obtaining total dynamic characteristics of unity integrated twice for a measuring system having a measuring device whose dynamic characteristics can be expressed by an $n$th order differential equation of the form $$G_a(s) = \frac{1}{1+K_1s+K_2s^2+ \ldots K_ns^n}$$

where $G_a$ is the transfer function of the device; $(s)$ is the operational operator expressed in Laplace notation; the coefficients $K_1$, $K_2$ and $K_n$ may be set arbitrarily and independently; and $n$ is any positive integer, said means comprising an apparatus for modifying and correcting the output of said device, said apparatus comprising a first means for performing mathematical operations on the output of said device, said first means comprising a means for integrating the device output, a means for reversing the polarity of said integrated device output and a means for multiplying said reversed polarity once integrated device output by $K_1$, a second means for performing mathematical operations on the once integrated device output, comprising a means for integrating the once integrated device output a second time and a means of multiplying the twice integrated device output by 1, an $n$th means for performing mathematical operations on the $(n-2)$th differentiated device output comprising a means for differentiating the $(n-2)$th differentiated device output again, a means for reversing the polarity of the $(n-1)$th differentiated device ouput if $n$ is an odd integer, and a means for multiplying the $(n-1)$th differentiated device output by $K_n$, an $(n+1)$th means for performing mathematical operations on the device output comprising a means for multiplying the device output by $K_2$, an $(n+2)$th means for performing a mathematical operation comprising a means for summing the resultant of the first, second, $n$th, and $(n+1)$th mathematical means for performing mathematical operations thereby to provide an output from the device and apparatus which provides dynamic characteristics of unity integrated twice for the measuring system.

17. Means for obtaining total dynamic characteristics of unity integrated twice multiplied by secondary mathematical operation means for a measuring system having a measuring device whose actual dynamic characteristics can be expressed by an $n$th order differential equation of the form $$G_a(s) = \frac{1}{1+K_1s+K_2s^2+ \ldots K_ns^n}$$

where $G_a$ is the transfer function of the device; $(s)$ is the operational operator expressed in Laplace notation; the coefficients $K_1$, $K_2$ and $K_n$ may be set arbitrarily and independently; and $n$ is any positive integer, said means comprising an apparatus for modifying and correcting the output of said device, said apparatus comprising a first means for performing mathematical operations on the output of said device, said first means comprising a means for integrating the device output, a means for reversing the polarity of said integrated device output and a means for multiplying said reversed polarity once integrated device output by $K_1$, a second means for performing mathematical operations on the once integrated device output, comprising a means for integrating the once integrated device output a second time and a means of multiplying the twice integrated device output by 1, an $n$th means for performing mathematical operations on the $(n-2)$th differentiated device output comprising a means for differentiating the $(n-2)$th differentiated device output again, a means for reversing the polarity of the $(n-1)$th differentiated device output if $n$ is an odd integer, and a means for multiplying the $(n-1)$th differentiated device output by $K_n$, an $(n+1)$th means for performing mathematical operations on the device output comprising a means for multiplying the device output by $K_2$, an $(n+2)$th means for performing a mathematical operation comprising a means for summing the resultant of the first, second, $n$th, and $(n+1)$th mathematical means, and $(n+3)$th means for performing mathematical operations on the summed output of said first, second, $n$th and $(n+1)$th mathematical means to provide an output from the device, apparatus and secondary mathematical operation means which provides dynamic characteristics of unity twice integrated and multiplied by secondary mathematical operations for the measuring system.

18. Means for obtaining total dynamic characteristics of unity integrated $m$ times for a measuring system having a measuring device whose actual dynamic characteristics can be expressed by an $n$th order differential equation of the form $$G_a(s) = \frac{1}{1+K_1s+K_2s^2+ \ldots K_ms^m+ \ldots K_ns^n}$$

wherein $G_a$ is the transfer function of the device; $(s)$ is the operational operator expressed in Laplace notation; where the coefficients $K_1$, $K_2$, $K_m$ and $K_n$ may be set arbitrarily and independently; and where $n$ is any positive integer; said means comprising an apparatus for modifying and correcting the output of said device, said apparatus comprising a first means for performing mathematical operations on the device output, said first means comprising a means for reversing the polarity of the device output, and a means for multiplying the reversed polarity device output by $K_m$, a second means for performing mathematical operations on the device output comprising a means for integrating the device output once and a means for multiplying the once integrated device output by $K_{m-1}$, a third means for performing mathematical operations on the once integrated device output comprising a means for integrating the once integrated device output a second time, a means for reversing the polarity of the twice integrated device output and a means for multiplying the reversed polarity twice integrated device output by $K_{m-2}$, an $m$th means for performing mathematical operations on the $(m-1)$th integrated device output, comprising a means for integrating the $(m-1)$th integrated device output an $m$th time, a means for reversing the polarity of the $m$th integrated device output if $m$ is an odd integer, and a means for multiplying the $m$th integrated device output by unity, an $(m+1)$th means for performing mathematical operations in the device output comprising a means for differentiating the device output once, a means for reversing the polarity of the once differentiated device output if $(m+1)$ is an even integer and a means for multiplying the once differentiated device output by $K_{m+1}$, an $n$th means for performing mathematical operations on the $(n-m)$th differentiated device output comprising a means for differentiating the $(n-m)$th differentiated device output again, a means for reversing the polarity of the $(n-m+1)$th differentiated device output if $(n-m+1)$ is an even integer and a means for multiplying the $(n-m+1)$ differentiated device output by $K_n$, an $(n+1)$th mathematical means for performing a mathematical operation comprising a means for summing the resultant output of the first, second, third, $m$th, $(m+1)$th and $n$th means for performing mathematical operations, whereby the resulting output of said measuring device and apparatus provide the desired dynamic characteristics of unity integrated $m$ times for the system.

19. Means for obtaining total dynamic characteristics of unity integrated $m$ times multiplied by a secondary mathematical operation means for a measuring system having a measuring device whose actual dynamic characteristics can be expressed by an $n$th order differential equation of the form $$G_a(s) = \frac{1}{1 + K_1 s + K_2 s^2 + \ldots K_m s^m + \ldots K_n s^n}$$

wherein $G_a$ is the transfer function of the device; $(s)$ is the operational operator expressed in Laplace notation; where the coefficients $K_1$, $K_2$, $K_m$ and $K_n$ may be set arbitrarily and independently; and where $n$ is any positive integer; said means comprising an apparatus for modifying and correcting the output of said device, said apparatus comprising a first means for performing mathematical operations on the device output, said first means comprising a means for reversing the polarity of the device output and a means for multiplying the reversed polarity device output by $K_m$, a second means for performing mathematical operations on the device output comprising a means for integrating the device output once and a means for multiplying the once integrated device output by $K_{m-1}$, a third means for performing mathematical operations on the once integrated device output comprising a means for integrating the once integrated device output a second time, a means for reversing the polarity of the twice integrated device output and a means for multiplying the reversed polarity twice integrated device output by $K_{m-2}$, an $m$th means for performing mathematical operations on the $(m-1)$th integrated device output, comprising a means for integrating the $(m-1)$th integrated device output an $m$th time, a means for reversing the polarity of the $m$th integrated device output if $m$ is an odd integer, and a means for multiplying the $m$th integrated device output by unity, an $(m+1)$th means for performing mathematical operations on the device output comprising a means for differentiating the device output once, a means for reversing the polarity of the once differentiated device output if $(m+1)$ is an even integer and a means for multiplying the once differentiated device output by $K_{m+1}$, an $n$th means for performing mathematical operations on the $(n-m)$th differentiated device output comprising a means for differentiating the $(n-m)$th differentiated device output again, a means for reversing the polarity of the $(n-m+1)$th differentiated device output if $(n-m+1)$ is an even integer and a means for multiplying the $(n-m+1)$ differentiated device output by $K_n$, an $(n+1)$th mathematical means for performing a mathematical operation comprising a means for summing the resultant output of the first, second, third, $m$th, $(m+1)$th and $n$th means for performing mathematical operations, an $(n+2)$th mathematical means for performing mathematical operations on the summed first, second, third, $m$th, $(m+1)$th and $n$th mathematical means comprising secondary mathematical means to provide an output from the device, apparatus and secondary mathematical means which provide dynamic characteristics of unity integrated $m$ times multiplied by secondary mathematical operations for the measuring system.

References Cited in the file of this patent

UNITED STATES PATENTS

| | | |
|---|---|---|
| 2,476,269 | Blackman | July 19, 1948 |
| 2,492,351 | Bode | Dec. 27, 1949 |
| 2,613,071 | Hansel | Oct. 7, 1952 |
| 2,674,125 | Eagan | Apr. 6, 1954 |
| 2,696,947 | Hanser | Dec. 14, 1954 |

OTHER REFERENCES

Proceedings of the I.R.E., May 1947 ("Analysis of Problems in Dynamics by Electronic Circuits" by Ragazzini Randall and Russell), pp. 444–452.

Greenwood, Holdom and MacRae, "Electronic Instruments," published 1948 by McGraw-Hill Book Company, Inc., pages 322–324.

Engineering, April 11 and 18, 1952 ("Accelerometers for Determining Aircraft Flight Loads" by J. Taylor), pp. 473–475, 506 and 507 in vol. 173.

Notice of Adverse Decision in Interference

In Interference No. 92,508 involving Patent No. 2,959,347, R. W. Kearns, Means for extending the useful frequency response of measuring instruments, final decision adverse to the patentee was rendered Sept. 30, 1963, as to claim 1.
[*Official Gazette November 12, 1963.*]